(12) United States Patent
Kurokawa et al.

(10) Patent No.: US 8,934,634 B2
(45) Date of Patent: Jan. 13, 2015

(54) STEREO SIGNAL PROCESSING CIRCUIT

(75) Inventors: Kazunari Kurokawa, Ashikaga (JP); Shinya Inaba, Gunma-ken (JP)

(73) Assignee: Semiconductor Components Industries, LLC, Phoenix, AZ (US)

( * ) Notice: Subject to any disclaimer, the term of this patent is extended or adjusted under 35 U.S.C. 154(b) by 710 days.

(21) Appl. No.: 13/032,216

(22) Filed: Feb. 22, 2011

(65) Prior Publication Data

US 2011/0206210 A1 Aug. 25, 2011

(30) Foreign Application Priority Data

Feb. 22, 2010 (JP) .................................. 2010-036531

(51) Int. Cl.
*H04B 1/16* (2006.01)
(52) U.S. Cl.
CPC ..................................... *H04B 1/1661* (2013.01)
USPC ............... 381/2; 381/119; 381/120; 381/102; 381/107; 455/295; 455/312; 375/345
(58) Field of Classification Search
CPC .............. H04B 1/10; H04B 1/30; H04B 1/26; H04B 1/1027; H04B 1/109; H04B 1/1036; H04B 1/1081; H04B 1/1661; H04B 1/1669; H04B 1/1676; H04B 1/1684; H04B 1/1692; H04B 1/64; H04B 2001/1045; H04B 2001/1054; H04B 7/00; H04B 15/06; H04B 2215/065; H04L 27/00; G06F 3/033; H03M 1/66; H03M 1/0614; H03G 3/3052; H04H 40/72; H04H 5/00; H03D 7/00
USPC ......... 381/1, 2, 3, 4, 7, 10, 11, 13, 80, 81, 84, 381/85, 101, 102, 104, 107, 108, 119, 120, 381/123; 455/295, 296, 311, 312, 313, 225; 375/345, 346, 349, 350, 351
See application file for complete search history.

(56) References Cited

U.S. PATENT DOCUMENTS

2009/0061801 A1 3/2009 Kobayashi

FOREIGN PATENT DOCUMENTS

| CN | 101383623 A | | 3/2009 |
|---|---|---|---|
| JP | 61-69231 | | 4/1986 |
| JP | 2003-174373 A | | 6/2003 |
| JP | 2003174373 A | * | 6/2003 |
| JP | 2005-167860 A | | 6/2005 |

(Continued)

OTHER PUBLICATIONS

Office Action issued in corresponding Japanese Application No. 2010-036531 dated Sep. 3, 2013, and English translation thereof (6 pages).

(Continued)

*Primary Examiner* — Leshui Zhang

(57) ABSTRACT

A noise level of an output signal is maintained low. An adjacent interference detecting unit compares a signal level of a wide band signal which is a desired station signal of a relatively wide band and a signal level of a narrow band signal which is a desired station signal of a relatively narrow band, and judges that adjacent interference has occurred when the signal level of the narrow band signal is less than or equal to a predetermined level even though the signal level of the wide band signal is greater than or equal to a predetermined level. A variable amplifier (36) attenuates an L-R signal and forms a monophonic signal when the signal level of the narrow band signal is lower than a predetermined level. With this process, when there is adjacent interference, a signal level of the narrow band signal at which the attenuating unit starts attenuating the L-R signal is changed to a relatively high value.

20 Claims, 4 Drawing Sheets

(56) References Cited

FOREIGN PATENT DOCUMENTS

| | | | |
|---|---|---|---|
| JP | 2005167860 A | * | 6/2005 |
| JP | 2009-021721 A | | 1/2009 |
| JP | 2009021721 A | * | 1/2009 |
| JP | 2009-152873 | | 7/2009 |

OTHER PUBLICATIONS

English abstract of Japanese Publication No. 2009-021721 published on Jan. 29, 2009, Espacenet database, 1 page.

English abstract of Japanese Publication No. 2003-174373 published on Jun. 20, 2003, Espacenet database, 2 pages.

English abstract of Japanese Publication No. 2005-167860 published on Jun. 23, 2005, Espacenet database, 2 pages.

espacenet patent abstract for Japanese Publication No. 61069231, Publication date Apr. 9, 1986 (1 page).

espacenet patent abstract for Japanese Publication No. 2009152873, Publication date Jul. 9, 2009 (1 page).

\* cited by examiner

STEREO SIGNAL PROCESSING CIRCUIT

CROSS-REFERENCE TO RELATED APPLICATIONS

The entire disclosure of Japanese Patent Application No. 2010-036531 filed on Feb. 22, 2010, including specification, claims, drawings, and abstract, is incorporated herein by reference in its entirety.

BACKGROUND

1. Technical Field

The present invention relates to a stereo signal processing circuit which decodes an L+R signal and an L−R signal from a received signal and obtains an L signal and an R signal by applying addition or subtraction between the L+R signal and the L−R signal.

2. Background Art

In a radio receiver, a predetermined reference signal which is determined according to a frequency of a desired station is mixed so that a signal from the desired station is converted into an intermediate frequency (IF) signal and a desired station signal is extracted from the IF signal.

In order to efficiently replay an audio signal, a wide band AGC (Automatic Gain Control) for attenuating the received signal when a signal level of the received signal is greater than a predetermined level and a narrow band AGC for attenuating the level of the received signal when the level of the extracted desired station signal is greater than or equal to a predetermined level are also provided.

There exist certain circuits which have a tuning circuit, and obtain the IF signal after a signal in a range near the desired station signal is extracted. In this case, the wide band AGC is operated according to the signal level after tuning.

In FM broadcasting, stereo broadcasting is employed. In this case, a main signal (L+R signal) and a sub signal (L−R signal) are transmitted, and the receiver adds the L+R signal and the L−R signal to obtain the L signal and subtracts the L−R signal from the L+R signal to obtain the R signal, to replay the stereo signal.

In such a stereo replay, when the signal level of the narrow band signal is reduced, an SN (signal-to-noise) ratio is degraded. Therefore, in such a case, the replay is sometimes switched to monophonic replay in which the signal is replayed only from the main signal.

Related art documents of the present invention include JP S61-69231 A and JP 2009-152873 A.

In the radio receiver, there may be cases where the signal of the desired station cannot be sufficiently received due to adjacent interference. Therefore, there is a desire to more suitably receive the signals in such a case.

SUMMARY

According to one aspect of the present invention, there is provided a stereo signal processing circuit which decodes an L+R signal and an L−R signal from an input signal and obtains an L signal and an R signal through an addition and a subtraction between the L+R signal and the L−R signal, the stereo signal processing circuit comprising an adjacent interference detecting unit which compares a signal level of a wide band signal which is a desired station signal of a relatively wide band and a signal level of a narrowband signal which is a desired station signal of a relatively narrow band, and judges that adjacent interference has occurred when the signal level of the narrow band signal is less than or equal to a predetermined signal level even though the signal level of the wide band signal is greater than or equal to a predetermined signal level, and an attenuating unit which attenuates the L−R signal and obtains a monophonic signal when the signal level of the narrow band signal is less than or equal to a predetermined signal level, wherein a signal level of the narrow band signal at which the attenuating unit starts attenuating the L−R signal is changed to a relatively high value when there is adjacent interference.

According to various aspects of the present invention, according to adjacent interference, the change to the monophonic signal can be started from a point where the signal level of the desired station signal is high, and the noise level of the output signal can be maintained low.

BRIEF DESCRIPTION OF THE DRAWINGS

A preferred embodiment of the present invention will be described in detail based on the following drawings, wherein.

DESCRIPTION OF EMBODIMENT

A preferred embodiment of the present invention will now be described with reference to the drawings.

Figure 1:
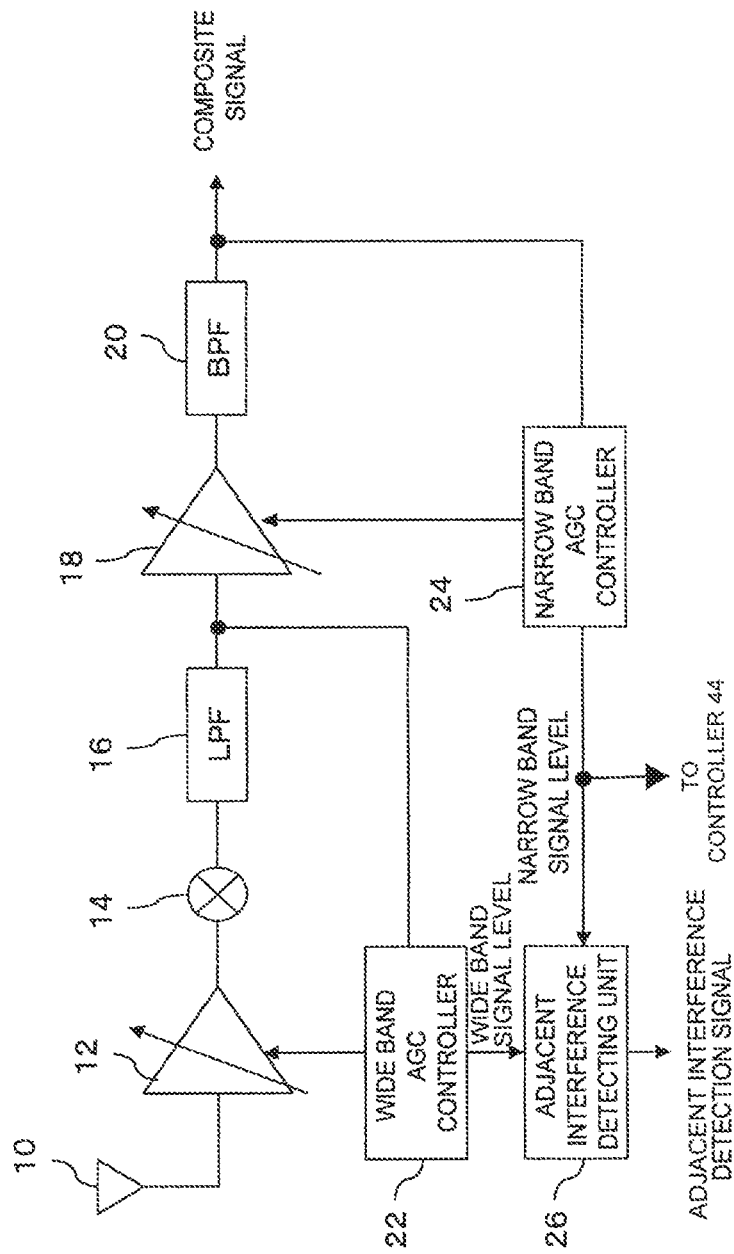
FIG. 1 is a diagram showing a structure of a signal processing unit (desired station signal receiving unit) of an FM radio receiver.
Figure 2:
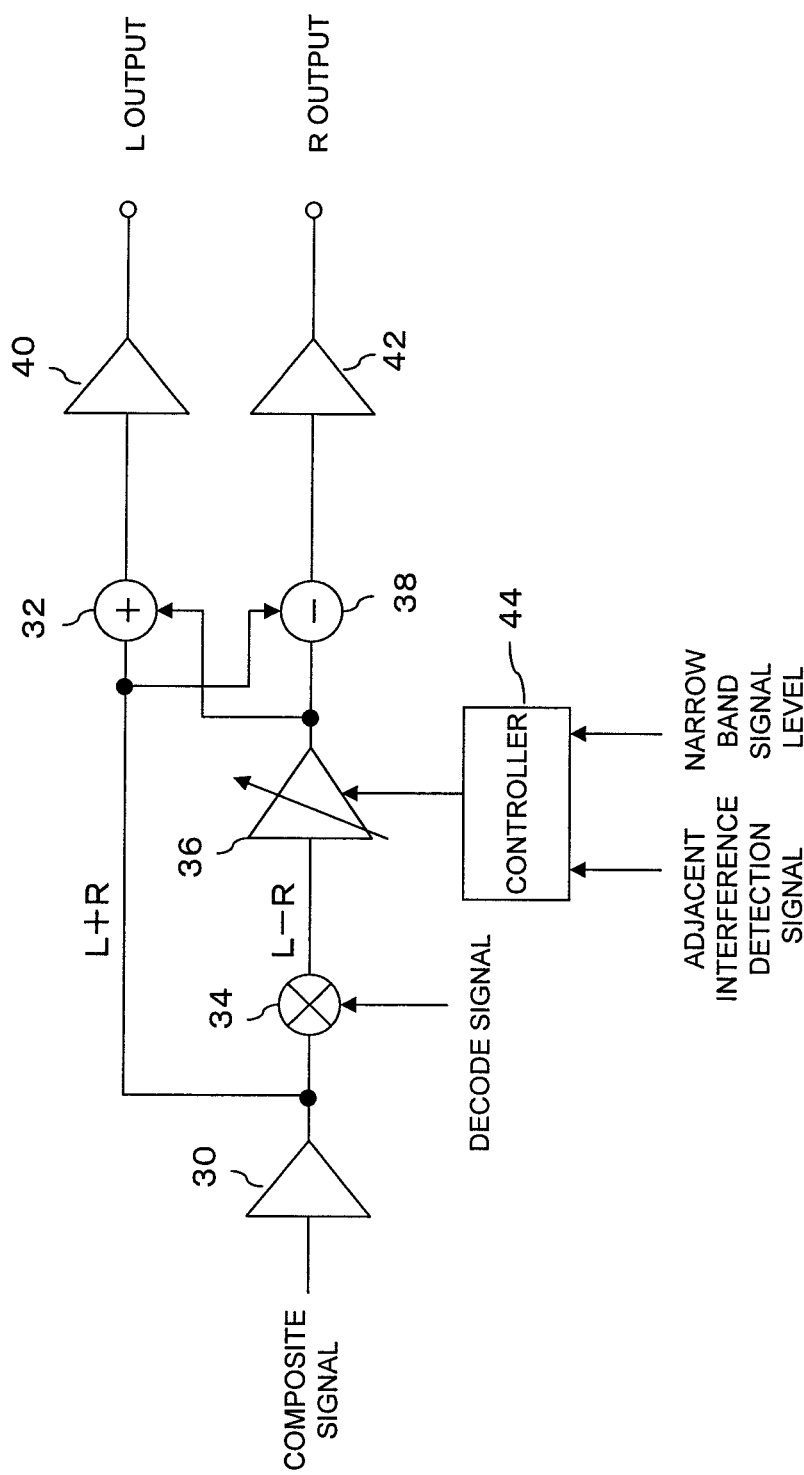
FIG. 2 is a diagram showing a structure of a signal processing unit (stereo signal processing unit) of the FM radio receiver.

FIGS. 1 and 2 are diagrams showing a structure of a signal processing unit of an FM radio receiver. FIG. 1 shows a structure from reception of a broadcast wave to obtaining a composite signal. The broadcast wave is received by an antenna 10, and is supplied to a variable amplifier 12 which is also called a low noise amplifier (LNA). A mixer 14 is connected to the variable amplifier 12. The mixer 14 mixes a signal from a local oscillator and the frequency of the desired station signal is frequency-converted (down-converted) to a predetermined intermediate frequency signal. The frequency-converted signal is supplied to a low-pass filter 16, where unnecessary high frequency components are removed.

An output of the low-pass filter 16 is supplied to a variable amplifier 18 which is also called a post amplifier, and an output of the variable amplifier 18 is supplied to a band-pass filter 20. The band-pass filter 20 extracts an intermediate frequency, and the IF signal of the desired station is obtained. The IF Signal is detected and an audio signal is decoded. The IF signal is a desired station signal of a stereo broadcast, and is a composite signal including the main (L+R) signal and the sub (L−R) signal.

In addition, the output of the low-pass filter 16 is supplied to a wide band AGC controller 22. The wide band AGC controller 22 detects a signal intensity of the output of the low-pass filter 16, and applies control such that, when the detected signal intensity is greater than or equal to a predetermined value, the output of the variable amplifier 12 is reduced. The received signal which is supplied from the antenna 10 may be attenuated by an attenuator provided inside the variable amplifier 12, or the amplification of the variable amplifier 12 may be changed.

The output of the band-pass filter 20 is also supplied to a narrow band AGC controller 24. The narrow band AGC controller 24 detects a signal intensity of the output of the band-pass filter 20, and applies control such that when the detected signal intensity is greater than or equal to a predetermined value, the output of the variable amplifier 18 is reduced. The signal which is input may be attenuated by an attenuator provided inside the variable amplifier 18, or the amplification of the variable amplifier 18 may be changed.

Signals from the wide band AGC controller 22 and the narrow band AGC controller 24 are supplied to an adjacent interference detecting unit 26. The adjacent interference detecting unit compares a signal intensity of the output of the band-pass filter 20 supplied to the narrow band AGC controller 24 (narrow band signal intensity) and a signal intensity of the output of the low-pass filter 16 supplied to the wide band AGC controller 22 (wide band signal intensity), to detect adjacent interference. For example, an adjacent interference detection signal is output when the wide band signal intensity is greater than or equal to a predetermined value and the narrow band signal intensity is less than or equal to a predetermined value. In addition, it is preferable that the adjacent interference detection signal is a signal which indicates the magnitude of a difference between the compared signals.

FIG. 2 shows a circuit for obtaining left and right signals (L signal and R signal) from the composite signal. The obtained L signal and the obtained R signal are decoded to form an audio signal, which is used for driving a speaker.

The composite signal for the IF signal of desired station which is output from the band-pass filter 20 is the main signal (L+R signal) in which the left signal L and the right signal R are added. In a monophonic receiver, this signal is amplified and decoded to obtain a monophonic signal. On the other hand, in order to decode the stereo, this signal is used as the main signal. The signal is amplified by an amplifier 30 and is then supplied to an adder 32.

The output of the amplifier 30 is also supplied to a mixer 34 where a decode signal is mixed, and the signal is converted to the sub signal (L−R signal).

An output of the mixer 34 is supplied to the adder 32 and a subtractor 38 through a variable amplifier 36. The L+R signal which is the output of the amplifier 30 is also supplied to the subtractor 38.

In the adder 32, a process of (L+R)+(L−R)=2L is executed, and this signal is output through an amplifier 40 as the L signal. In the subtractor 38, a process of (L+R)−(L−R)=2R is executed, and this signal is output through an amplifier 42 as the R signal.

In the present embodiment, in the variable amplifier 36, an amount of attenuation of the sub signal is controlled by a control signal from a controller 44. The controller 44 adjusts the amount of attenuation of the sub signal at the variable amplifier 36 based on the adjacent interference detection signal which is supplied from the adjacent interference detecting unit 26 and a signal level of the narrow band signal which is supplied from the narrow band AGC controller 24.

Figures 3, 4:
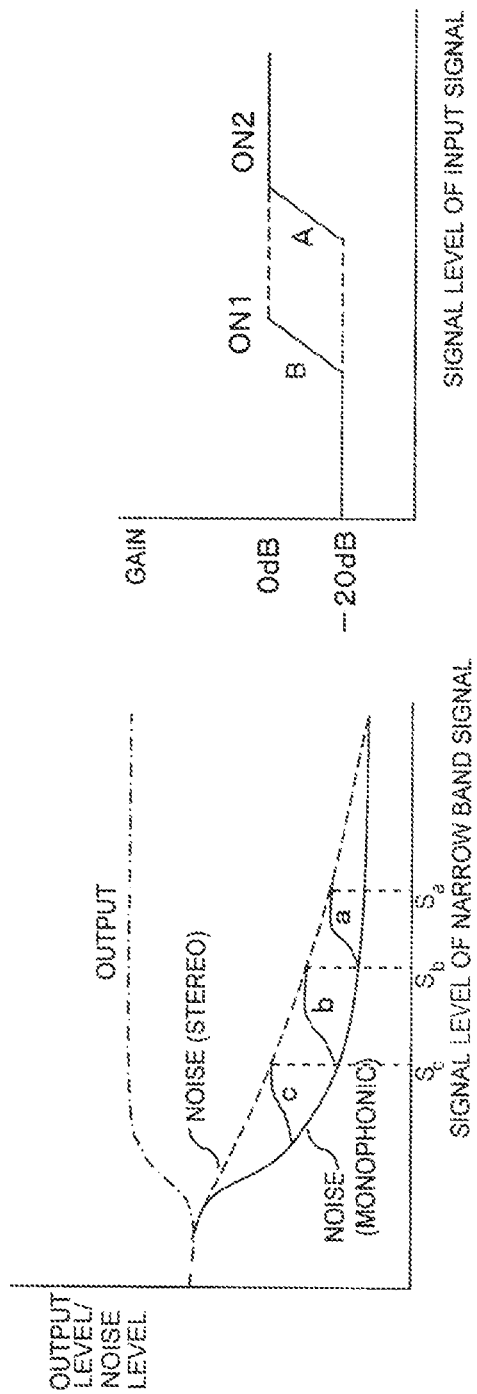
FIG. 3 is a diagram for explaining the timing of the change to the monophonic signal.
FIG. 4 is a diagram for explaining the timing of wide band AGC.

The above-described adjustment will now be described with reference to FIG. 3. In FIG. 3, the horizontal axis represents a signal level of the narrow band signal (desired station signal) and the vertical axis represents both an output level and a noise level. The output level in this case represents a sum of the L signal and the R signal in FIG. 2, but may alternatively be one of these signals. The output level is slightly suppressed when the signal level of the narrow band signal is very low, but at higher signal levels, the output level is adjusted to an approximate constant level. When the signal level of the narrow band signal is 0, all of the output becomes noise.

When the signal level of the narrow band signal is increased to a certain degree, the output level is controlled at an approximately constant level. As the signal level of the narrow band signal is increased, the percentage of the broadcast wave of the desired station is gradually increased, and the noise level is reduced. For the stereo signal (the L signal and the R signal) and the monophonic signal (L+R signal only), the noise levels differ from each other. In FIG. 3, this difference can be seen by a difference between noise (stereo) and noise (monophonic). The adjacent interference detecting unit 26 generates the detection signal such that when the signal level of the narrow band signal is reduced from a predetermined value, the output gradually transfers to the monophonic signal.

In this exemplified configuration, the start level is divided into 3 stages, and the variable amplifier 36 is controlled according to the magnitude of the adjacent interference such that as the adjacent interference is increased, the device shifts to the monophonic configuration at a higher signal level of the narrow band signal. In other words, when no adjacent interference is detected, the device shifts to monophonic configuration at a relatively low input level as shown by c, and according to the degree of the adjacent interference, the device shifts to the monophonic configuration from a relatively high input level, as shown by b and a.

In this manner, the noise level can be reduced, and even when the input level is low, the SN ratio can be maintained at a relatively high level.

FIG. 4 shows an example operation of the wide band AGC. The wide band AGC controller 22 attenuates the input signal when the input signal level is greater than or equal to a predetermined level. In the exemplified configuration, the attenuation of the input signal is changed according to the presence/absence of adjacent interference. That is, when there is no adjacent interference, the input signal is attenuated from a relatively low level as shown by B. On the other hand, when there is an adjacent interference, the input level at which the attenuation of the input signal starts is increased as shown by A. In this manner, it is possible to prevent significant attenuation of the desired station signal when there is adjacent interference.

In the above-described example configuration, the sub signal (L−R signal) is attenuated according to the adjacent interference. However, in order to improve the SN ratio, it is also possible to change the frequency characteristic of the sub signal. More specifically, the sub signal which is the output of the mixer 34 is a signal of a certain frequency. By limiting the frequency for the sub signal, it is possible to remove the influence of the adjacent interference, even though the signal level of the sub signal would be reduced. Therefore, it is also preferable to change the frequency characteristic of the sub signal in place of or in addition to the attenuation of the sub signal.

As an example of the change of the frequency characteristic, for example, it is known that as the input signal is weakened, the noise is raised from a relatively high frequency, and therefore, that a configuration is employed in which the frequency characteristic of the sub signal is shifted to the lower frequency side. In other words, by reducing the cut-off frequency of the low-pass filter, the influence of the adjacent interference can be reduced.

Figure 5:
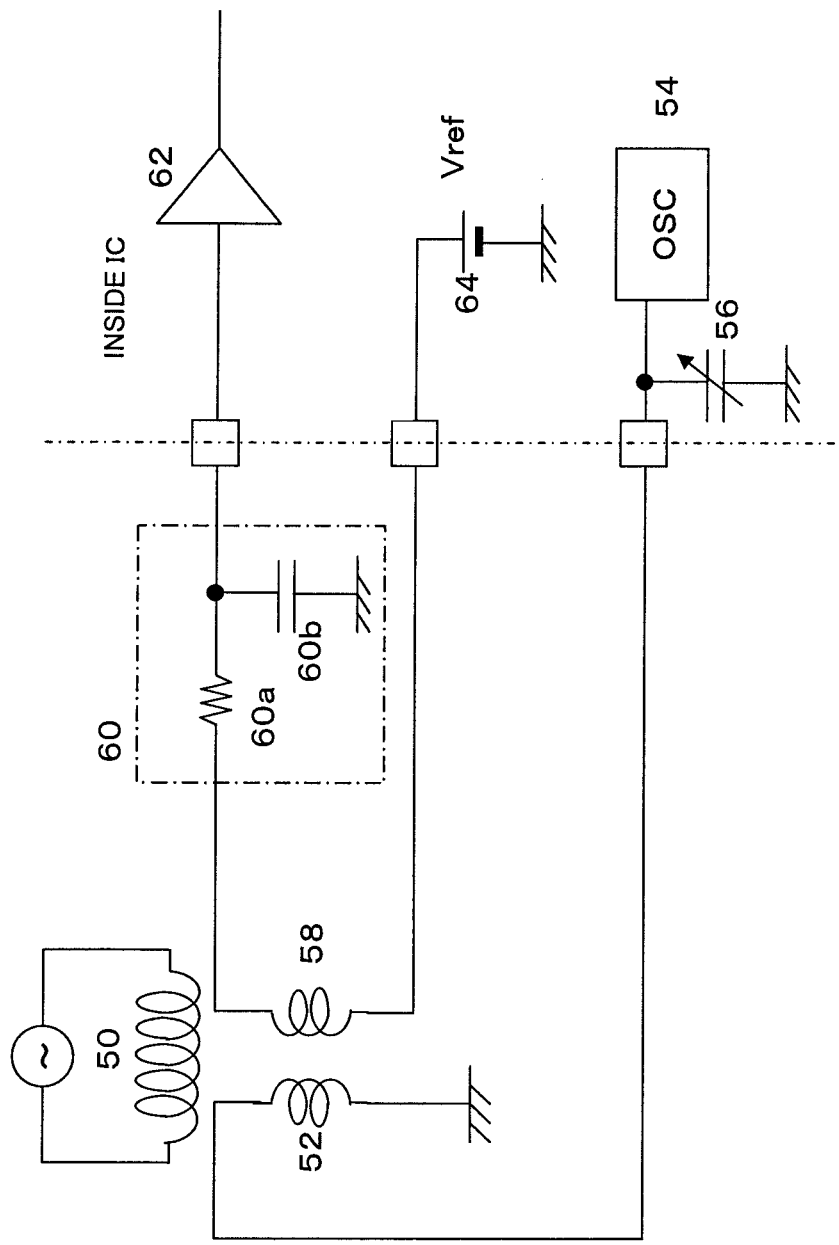
FIG. 5 is a diagram showing a structure of an AM reception and tuning circuit.

FIG. 5 shows a portion of a tuning circuit in an AM radio. A received signal which is received by an antenna is supplied to a coil 50. On one end of a coil 52, an oscillator 54 is connected and a variable capacitor 56 is connected. Because the other end of the coil 52 and the other end of the variable capacitor 56 are connected to ground, the oscillator 54, variable capacitor 56, and coil 52 form an oscillation circuit which oscillates at an arbitrary frequency that is set by changing the capacitance of the variable capacitor 56.

By causing the oscillation circuit to oscillate at a frequency of the desired station, the antenna can be tuned with the frequency of the desired station. Because a coil 58 is provided in addition to the coils 50 and 52, the received signal which is received by the antenna can be obtained at the coil 58. A filter 60 is provided for preventing AM inflow interference, and is a low-pass filter comprising a resistor 60*a* connected to one end of the coil 58 and a capacitor 60*b* which connects the other end of the resistor to ground. The coil 58 has one end connected through the filter 60 to a low noise amplifier 62 of a receiver circuit which processes a tuned signal and the other end connected to a reference power supply 64 which supplies a referenced voltage Vref.

In the related art, the antenna oscillation circuit is formed using the coil 58 for reception. Because of this, when the filter 60 is inserted, the oscillation frequency of the antenna oscillation circuit would be changed. Therefore, in the structure of the related art, the filter cannot be inserted. According to the present structure, the antenna oscillation circuit comprising the oscillator 54, variable capacitor 56, and coil 52 is separated from the coil 58 for obtaining the desired station signal. Because of this, it is possible to insert the filter 60 and effectively prevent the AM inflow interference without adversely affecting the oscillation frequency of the antenna oscillation circuit. In FIG. 5, a white rectangle represents a terminal of a semiconductor integrated circuit (IC), and the variable capacitor 56 can be included in the IC.

What is claimed is:

1. A stereo signal processing circuit which decodes an L+R signal and an L−R signal from an input signal and obtains an L signal and an R signal through an addition and a subtraction between the L+R signal and the L−R signal, the stereo signal processing circuit comprising:
   an adjacent interference detecting circuit which compares a signal level of a wide band signal which is a desired station signal of a relatively wide band and a signal level of a narrow band signal which is a desired station signal of a relatively narrow band, and detects adjacent interference in response to a comparison of the signal level of the narrow band and the signal level of the wide band signal;
   an attenuating circuit which attenuates the L−R signal; and
   a controller having an output coupled to the attenuating circuit for controlling a gain thereof, wherein the controller selectively attenuates the L−R signal at a start level of the narrow band signal and the start level of the narrow band signal varies based on the adjacent interference.

2. The stereo signal processing circuit according to claim 1, wherein the start level decreases based on increasing adjacent interference.

3. The stereo signal processing circuit according to claim 2, further comprising
   a wide band automatic gain control circuit which controls the signal level of the wide band signal by attenuating a signal level of a received signal when the signal level of the wide band signal is greater than or equal to a predetermined signal level, wherein
   the wide band automatic gain control circuit changes the signal level of the wide band signal at which the attenuation of the level of the received signal is started according to the amount of the adjacent interference.

4. The stereo signal processing circuit according to claim 1, further comprising
   a wide band automatic gain control circuit which controls a signal level of the wide band signal by attenuating a signal level of a received signal when the signal level of the wide band signal is greater than or equal to a predetermined signal level, wherein
   the wide band automatic gain control circuit changes the signal level of the wide band signal at which the attenuation of the level of the received signal is started to a relatively low value when there is adjacent interference.

5. A receiver for a stereo signal comprising:
   a signal processing unit for receiving a broadcast signal and for providing a composite signal in response, and having a first control output for providing an adjacent interference detection signal in response to a level of interference in the broadcast signal, and a second control output for providing a narrow band signal level;
   a stereo audio signal processing circuit for developing an L+R signal and an L−R signal in response to the composite signal, for providing a first output signal as a sum of the L+R signal and the L−R signal, and a second output signal as a difference of the L+R signal and the L−R signal, the stereo audio signal processing circuit comprising:
      a variable amplifier for selectively attenuating the L−R signal; and
      a controller responsive to the narrow band signal level and the adjacent interference detection signal for causing the variable amplifier to attenuate the L−R signal in response to the narrow band signal level being less than a start level, and changing the start level in response to the adjacent interference detection signal.

6. The receiver of claim 5 wherein:
   the controller selectively attenuates the L−R signal by a predetermined amount when the narrow band signal level is below a low value corresponding to a predetermined range.

7. The receiver of claim 6 wherein:
   the controller gradually attenuates the L−R signal between the predetermined amount and zero attenuation based on a level of the L−R signal within the predetermined range.

8. The receiver of claim 6 wherein:
   the controller further keeps the L−R signal level constant when the level of the L−R signal is above a high value corresponding to the predetermined range.

9. The receiver of claim 5, wherein
   the signal processing unit provides the adjacent interference detection signal when the signal level of the narrow band signal is less than or equal to a first predetermined signal level even though a wide band signal level is greater than or equal to a second predetermined signal level.

10. The receiver of claim 5, wherein the signal processing unit comprises:
   a first variable amplifier having an input for receiving the broadcast signal, and an output;
   a mixer having an input coupled to the output of the first variable amplifier, and an output;
   a lowpass filter having an input coupled to the output of the mixer, and an output for providing a wide band signal;
   a second variable amplifier having an input coupled to the output of the lowpass filter, and an output; and a bandpass filter having an input coupled to the output of the second variable amplifier, and an output for providing the composite signal, wherein the signal processing unit determines a wide band signal level in response to the output of the lowpass filter and determines the narrow band signal level in response to the composite signal.

11. The receiver of claim 10, wherein the signal processing unit further comprises:
a wide band automatic gain control (AGC) controller having an input coupled to the output of the lowpass filter, a first output for providing the wide band signal level, and an second output coupled to a gain control input of the variable amplifier;
a narrow band AGC controller having an input coupled to the output of the bandpass filter, a first output for providing the narrow band signal level, and a second output coupled to gain control input of the second variable amplifier; and
an adjacent interference detecting circuit for providing the adjacent interference detection signal in response to the wide band signal level and the narrow band signal level.

12. The receiver of claim 10, wherein the stereo audio signal processing circuit comprises:
an amplifier having an input for receiving the composite signal, and an output;
an adder having a first input coupled to the output of the amplifier, a second input, and an output for providing a left channel signal;
a mixer having an input coupled to the output of the amplifier, and an output;
wherein the variable amplifier has an input coupled to the output of the mixer, and an output coupled to the second input of the adder; and
a subtractor having an input coupled to the output of the amplifier, a negative input coupled to the output of the variable amplifier, and an output for providing a right channel signal.

13. A method comprising:
receiving a radio frequency signal having a stereo audio signal;
converting the stereo audio signal to a lower frequency to form a wide band signal;
filtering the wide band signal to form a composite signal;
separating the composite signal into an L+R signal and an L−R signal;
determining an amount of adjacent interference in the radio frequency signal;
selectively attenuating the L−R signal at a start level of the L−R signal and the start level of the L−R signal varies based on the amount of adjacent interference to form a selectively attenuated L−R signal; and
adding the selectively attenuated L−R signal to the L+R signal to form a first output signal, wherein the first output signal is a left channel audio signal when the L−R signal is not attenuated, and is a monophonic audio signal when the L−R signal is completely attenuated.

14. The method of claim 13 further comprising:
subtracting the L−R signal from the L+R signal to obtain a second output signal, wherein the second output signal is a right channel audio signal when the L−R signal is not attenuated.

15. The method of claim 13 wherein the converting comprises:
mixing the radio frequency signal to the lower frequency; and
low pass filtering the radio frequency signal so mixed to form the wide band signal.

16. The method of claim 13 wherein the filtering comprises:
filtering the wide band signal in a bandpass filter to form the composite signal.

17. The method of claim 13 wherein the selectively attenuating comprises:
selectively attenuating the L−R signal based on the level of the L−R signal and the amount of adjacent interference within a predetermined range.

18. The method of claim 17 wherein the selectively attenuating further comprises:
attenuating the L−R signal by a predetermined amount when the level of the L−R signal is below a low value corresponding to the predetermined range.

19. The method of claim 18 wherein the selectively attenuating further comprises:
gradually attenuating the L−R signal between the predetermined amount and zero attenuation based on a level of the L−R signal within the predetermined range.

20. The method of claim 17 wherein the selectively attenuating further comprises:
keeping the L−R signal level constant when the level of the L−R signal is above the predetermined range.

* * * * *